April 22, 1969
R. A. LAUDISE ET AL
3,440,025
HYDROTHERMAL GROWTH OF POTASSIUM TANTALATE-POTASSIUM NIOBATE
MIXED CRYSTALS AND MATERIAL SO PRODUCED
Filed June 20, 1966
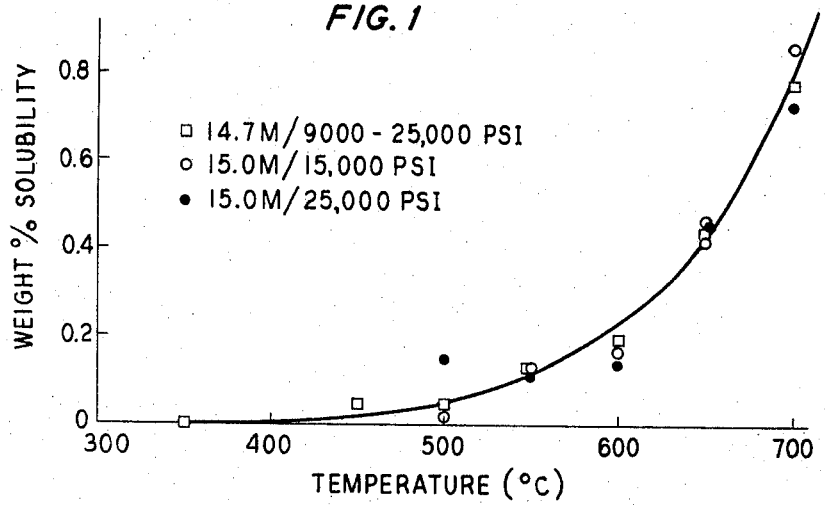
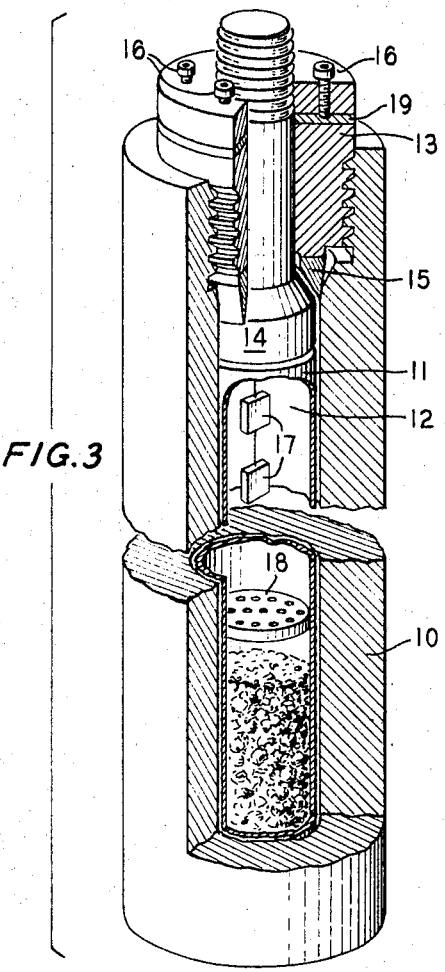
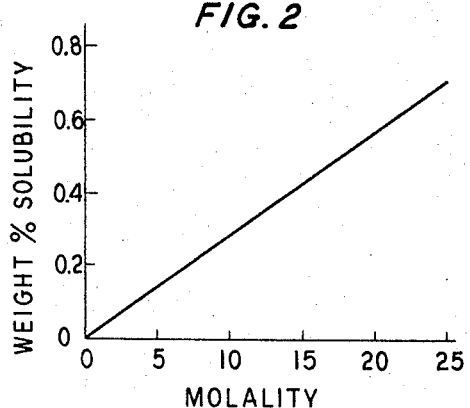
INVENTORS R. A. LAUDISE
D. J. MARSHALL
BY
ATTORNEY

United States Patent Office

3,440,025
Patented Apr. 22, 1969

3,440,025
HYDROTHERMAL GROWTH OF POTASSIUM TANTALATE-POTASSIUM NIOBATE MIXED CRYSTALS AND MATERIAL SO PRODUCED
Robert A. Laudise, Berkeley Heights, and David J. Marshall, East Orange, N.J., assignors to Bell Telephone Laboratories, Incorporated, Berkeley Heights, N.J., a corporation of New York
Filed June 20, 1966, Ser. No. 558,911
Int. Cl. B01t 17/20
U.S. Cl. 23—301            9 Claims

ABSTRACT OF THE DISCLOSURE

KTN compositions (mixed crystals of potassium tantalate-potassium niobate) are produced by hydrothermal growth using an aqueous potassium hydroxide transfer medium. Resulting crystals show reduced flawing due to lamellar defects as compared with crystals grown by flux techniques.

---

This invention relates to the hydrothermal growth of mixed crystals of the potassium tantalate-potassium niobate system, to the crystals so produced and to devices using such crystals.

The device properties of compositions of the KTN system (potassium tantalate-potassium niobate mixed crystals) are described in 37 Journal of Applied Physics, 388 (1966). These materials are of significant interest, both for elastic wave devices and electromagnetic wave devices, the latter over a very broad frequency range including microwaves and the visible spectrum. At this time, however, interest is largely concentrated on KTN devices designed for use at visible and near visible wavelengths. Hydrothermally grown materials in accordance with this invention, while desirably incorporated in any KTN device, are most advantageous for devices operating at visible and near visible wavelengths.

As is now well known to those familiar with devices operating at visible frequencies, KTN is an extremely efficient electro-optic material which at the same time manifests all the desirable chemical and physical properties for fabrication of a practical device. The already excellent electro-optic coefficient is still further enhanced by the fact that the relationship between refractive index or dielectric constant and applied electric field is quadratic, so that a given increase in index is accomplished with decreasing increments of applied field. This gives rise to the possibility of biasing to a given index, or constant, or number of phase retardations so that a desired swing in any one of these properties may be accomplished with a relatively small change in applied field. Biased electro-optic devices utilizing KTN crystals of the order of a centimeter in length have in this fashion been operated to produce a maximum modulation corresponding with a phase retardation, with a maximum peak modulating field of the order of 10 volts. Other device uses take advantage of this quadratic relationship.

For a three-component system, KTN has proven to be relatively easy to grow. Large, nearly perfect crystals have been produced by melt or flux growth. These crystals have been utilized in the successful operation of electro-optic modulators and light deflectors, as well as microwave and elastic wave devices. Unfortunately, however, crystals produced by melt or flux growth have to date manifested a lamellar defect which results in beam broadening and therefore is detrimental for devices operating at visible and near visible wavelengths. While it is possible to select crystalline samples in which such defects are minimized, this flawed growth is a significant obstacle to quantity use of the material.

Needless to say, in so valuable a class of material as KTN, exhaustive studies have been made to determine the nature of the lamellar defects. Careful measurements of unit cell size and careful compositional analysis have revealed that the lamellae are accompanied by a sharp change in both parameters. Further studies have indicated the compositional dependence on temperature in melt growth to be sufficiently high to account for such flaws.

In accordance with the present invention, it has been found that lamellar defects may be further minimized by hydrothermal growth in accordance with a critically specified set of processing conditions. While no dependence is had on any particular responsible mechanism, fundamental studies have revealed the dependence of composition on temperature to be significantly lessened as compared with that which obtains during melt growth. It may be valid to assume that small temperature fluctuations, unavoidable to some degree, therefore result in smaller compositional fluctuations during hydrothermal growth.

The solvent necessarily utilized in this process is potassium hydroxide. The chemist will recognize that this is a particularly unlikely material due to the poor solubility to be expected in view of the common ion effect. In fact, over the permissible range of KOH, 5 molal to 25 molal, and for the prescribed conditions, the solubility is generally less than one weight percent. A particular advantage of the inventive process is the fact that the system is near congruently saturating, so that the composition of the crystallizing material is always very close to that of the nutrient. Exceeding the upper limit of 25 molal is harmful in that the system becomes less congruent. Such excess concentrations are generally self-limiting in any event, since the increasing viscosity tends to slow down the transport process and so impose a limit on the rate of crystal growth. Use of concentrations below 5 molal is not absolutely precluded but results in impractically slow rates of growth. Generally, a middle range of concentration, from 12 molal to 16 molal, is preferred. Growth rates are acceptable, and the system is very close to congruently saturating.

Temperature measured at the nutrient position is desirably kept at a minimum of 550° C. The absolute upper limit is the melting point of KTN, which over the useful pressure range is of the order of 1100° C. A somewhat lower limit is generally imposed by equipment requirements. Maxima so determined for commercially feasible apparatus are likely to be of the order of 720° C. It is usually desirable to operate at temperatures close to the maximum permitted. The effects of increasing temperature are generally desirable. Growth rate goes up, and surface mobility on the growing crystal also goes up, so that crystalline perfection is improved.

Growth rate and crystal perfection are affected by the magnitude of the temperature gradient between the nutrient and the growing crystal. Here, use of smaller gradients reduces the growth rate but since more time is permitted for rearrangement of atoms on the surface of the growing crystal, perfection is improved. A minimum gradient of about 5° C. is specified. This value arises from consideration of permissably small growth rate and from the fact that temperature control of smaller gradients is generally difficult with commercially available apparatus. A preferred minimum of 10° C. is recommended. The maximum tolerable gradient is considered to lie at about 60° C. For larger gradients, spontaneous nucleation becomes a significant problem.

In common with other hydrothermal processes, the minimum pressure is the critical pressure of the aqueous KOH system since a two-phase region is to be avoided. A minimum pressure of about 5000 pounds per square inch and an optimum of the order of 15,000 p.s.i. are so specified. Maxima are again equipment limited from this standpoint, being of the order of 25,000 to 30,000 p.s.i. Since, however, solubility has not been found to be particularly pressure dependent, the usual reasons for preferring greater pressure are not applicable.

Seed orientation is to be fixed by the desired product. Generally, growth proceeds at reasonable rates on any of the {100} or {111} faces. Other growth directions are permitted.

KTN compositions are defined in terms of the composition:

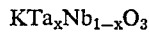

$$KTa_xNb_{1-x}O_3$$

in which $x$ is from 0.2 to 0.8. For many purposes, the desired value of $x$ depends upon the temperature at which the material is to be used. For room temperature or near room temperature operation, a preferred range for $x$ is from 0.56 to 0.68, and it is over this latter compositional range to which the inventive process is best applied. A still more preferred range is from 0.60 to 0.68. This latter range ensures a minimum of ferroelectric activity at room temperature and above.

While description is largely in terms of this fundamental composition, it is well known that additives may be desirable. One such additive is tin, which may be included in amounts of up to about 0.01 in terms of the above formula, the purpose of this additive being to increase resistivity. Where it is desired to increase conductivity, divalent ion additions are indicated. Suitable elements for this purpose are calcium, zinc, etc.

A detailed description of the hydrothermal process is not considered to be within the scope of this specification. Such fundamental information may be gleaned from Progress in Inorganic Chemistry, vol. 3, p. 1 et seq., Wiley & Sons, New York, 1962, as well as any of the standard texts on the subject.

Further description is expedited by reference to the drawing, in which:

FIG. 1, on coordinates of weight percent solubility and temperature, is a plot showing the dependence of solubility on temperature for various noted pressures;

FIG. 2, on coordinates of weight percent solubility and molality, is a plot showing the variation in KTN concentration in the aqueous medium resulting from change in KOH concentration; and FIG. 3 is a perspective view, partly in cross section, of an autoclave suitable for the practice of the inventive process.

Data is plotted in FIG. 1 for three different pressure conditions, as indicated. The figure is illustrative of the fact that (1) weight percent solubility of KTN is generally below one percent, and (2) variation of solubility with pressure is slight. Solubility does, however, increase to values appreciably above one percent with further increasing temperature, and for this reason such temperatures are useful, apparatus permitting.

From FIG. 2, it is seen that KTN solubility is largely a linear function of KOH molality. In this instance, data is plotted up to the specified maximum of 25 molal, which for the temperature of 650° C. and pressure of 15,000 p.s.i. for which the data was plotted, results in a solubility of the order of 0.7 weight percent.

FIG. 3 depicts the new familiar modified Bridgeman apparatus used for hydrothermal growth. The only significant difference from apparatus used for quartz growth is the inclusion of a precious metal liner of, for example, platinum, desirably incorporated because of the increased reactivity of the system. The main body 10 contains a precious metal can 11, so defining a chamber 12. A main nut 13 is threaded into the upper portion of the chamber. A plunger 14 is fitted into the bore 12 and is free to rise under the influence of pressure in the chamber. As the plunger rises, it contacts a steel seal ring 15 and is finally stopped by bearing against the main nut 13 through the seal ring. This action provides an effective seal for the growth chamber. The chamber is initially temporarily sealed by means of the set screws 16 which compress a resilient washer 19 against the shank of the plunger. The space between the can 11 and the inner wall of body 10 is filled with water to a degree necessary to minimize pressure differential between the inside and outside of can 11.

For the growth procedure the chamber 12 is charged with nutrient material. The aqueous medium of potassium hydroxide is added in the amount required to produce the requisite pressure at the desired operating temperature. Seed crystals such as 17 are suspended as shown. A baffle 18 may be interposed between the nutrient mass and the seed crystals so as to divide the chamber into two thermal zones. The baffle maintains a reliable temperature differential between the nutrient and the crystallization zone and expedites simultaneous growth of two or more seeds. Suitable baffles are described in United States Patent 2,895,812, issued July 21, 1959.

Chemically, the nutrient mass should be such as to yield potassium tantalate and potassium niobate. Acceptable materials include mixed crystals as well as a mixture of separate end members. Other compounds which will decompose or react to produce the desired material may be substituted. Additives may be made in similar fashion. Tin may be added as $SnO_2$, calcium, as CaO both in amounts as yield up to about 0.01 in the indicated formula. Unintentional impurities may be tolerated to a maximum total content of about the same amount. From the physical standpoint, the usual desiderata are indicated. For example, particle size of the nturient mass should be such as to present large surface area to the dissolving media.

The invention has been described largely in terms of the specific growth parameters required for the inventive process. Conditions essential to hydrothermal growth per se have not been treated in detail. The apparatus depicted is merely exemplary and may be replaced by other equipment having the required structural properties.

Various modifications of the described process are apparent. All such variations. which basically relay on the fundamental teachings through which this invention has advanced the art, are considered within the scope of the invention.

What is claimed is:
1. Method for growing crystalline material consisting essentially of the composition $KTa_xNb_{1-x}O_3$, in which $x$ equals from 0.2 to 0.8, which comprises disposing a crystal consisting essentially of the said composition and a mass of nutrient capable of yielding such composition in a 5 to 25 molal aqueous solution consisting of potassium hydroxide, heating said solution to a temperature of at least 550° C. but below the melting point of the crystalline material while under a pressure exceeding its critical pressure and maintaining a temperature difference between said seed and said mass of nutrient of at least 5° C. but not greater than about 60° C. until a substantial increase in the size of said crystal is obtained.

2. Method of claim 1 in whicht he said nutrient comprises the said composition.

3. Method of claim 1 in which $x$ is from 0.56 to 0.68.

4. Method of claim 1 in which $x$ is from 0.60 to 0.68.

5. Method of claim 1 in which the said temperature is at least 645° C.

6. Method of claim 5, in which the said gradient is at least 10° C.

7. Method of claim 6 in which the said solution has a molality of from 12 to 16.

8. Method of claim 7 in which the pressure is at least 5000 p.s.i.

9. Crystalline material grown in accordance with the process of claim 1.

References Cited

UNITED STATES PATENTS

| | | | |
|---|---|---|---|
| 3,092,448 | 6/1963 | Kennedy | 23—51 |
| 3,201,209 | 8/1965 | Caporaso | 23—301 |

NORMAN YUDKOFF, *Primary Examiner.*

U.S. Cl. X.R.

23—15, 24, 51, 302